(12) United States Patent
Hentrich et al.

(10) Patent No.: US 9,309,939 B2
(45) Date of Patent: Apr. 12, 2016

(54) COMPOSITE BRAKE DISC

(75) Inventors: Cornelius Hentrich, Waiblingen (DE); Ralph Mayer, Boeblingen (DE)

(73) Assignee: Daimler AG, Stuttgart (DE)

(*) Notice: Subject to any disclaimer, the term of this patent is extended or adjusted under 35 U.S.C. 154(b) by 86 days.

(21) Appl. No.: 13/822,907

(22) PCT Filed: Dec. 9, 2011

(86) PCT No.: PCT/EP2011/006205
§ 371 (c)(1),
(2), (4) Date: Sep. 19, 2013

(87) PCT Pub. No.: WO2012/107068
PCT Pub. Date: Aug. 16, 2012

(65) Prior Publication Data
US 2014/0000995 A1    Jan. 2, 2014

(30) Foreign Application Priority Data

Feb. 11, 2011 (DE) .......................... 10 2011 011 004

(51) Int. Cl.
*F16D 65/12* (2006.01)
*F16D 65/02* (2006.01)

(52) U.S. Cl.
CPC ........ *F16D 65/123* (2013.01); *F16D 2065/136* (2013.01); *F16D 2065/1392* (2013.01); *F16D 2200/0034* (2013.01); *F16D 2200/0039* (2013.01)

(58) Field of Classification Search
CPC .......... F16D 65/123; F16D 2065/1356; F16D 2065/1376; F16D 2065/1384; F16D 2250/0061; F16D 2065/1392; F16D 2065/136
See application file for complete search history.

(56) References Cited

U.S. PATENT DOCUMENTS

| 3,661,235 | A | 5/1972 | Harrison |
| 4,256,209 | A | 3/1981 | Luepertz |
| 6,135,247 | A | 10/2000 | Bodin et al. |
| 7,044,563 | B2 * | 5/2006 | Suzuki ..................... 301/105.1 |
| 2005/0056498 | A1 | 3/2005 | Gripemark et al. |
| 2005/0099058 | A1 | 5/2005 | Suzuki |
| 2012/0085603 | A1 | 4/2012 | Mayer et al. |

FOREIGN PATENT DOCUMENTS

| CA | 2560717 A1 * | 10/2005 |
| DE | 20 13 535 A | 10/1970 |

(Continued)

OTHER PUBLICATIONS

Corresponding International Search Report with English Translation dated Mar. 14, 2012 (four (4) pages).

(Continued)

*Primary Examiner* — Anna Momper
(74) *Attorney, Agent, or Firm* — Crowell & Moring LLP

(57) ABSTRACT

A composite brake disk for a motor vehicle includes a brake disk chamber and a related brake ring connected together by a joining process. In one joint area an internal brake ring tooth profile engages in a brake disk chamber tooth profile. The brake disk chamber tooth profile has brake disk chamber tooth faces in circular arc form, whereas the brake ring-tooth profile has brake ring tooth faces in the form of an involute. Due to the special version of the pairing of two different tooth formats a fixed, load-bearing connection can be achieved between the brake disk chamber and the brake ring.

8 Claims, 2 Drawing Sheets

(56) References Cited

FOREIGN PATENT DOCUMENTS

Figure 4:
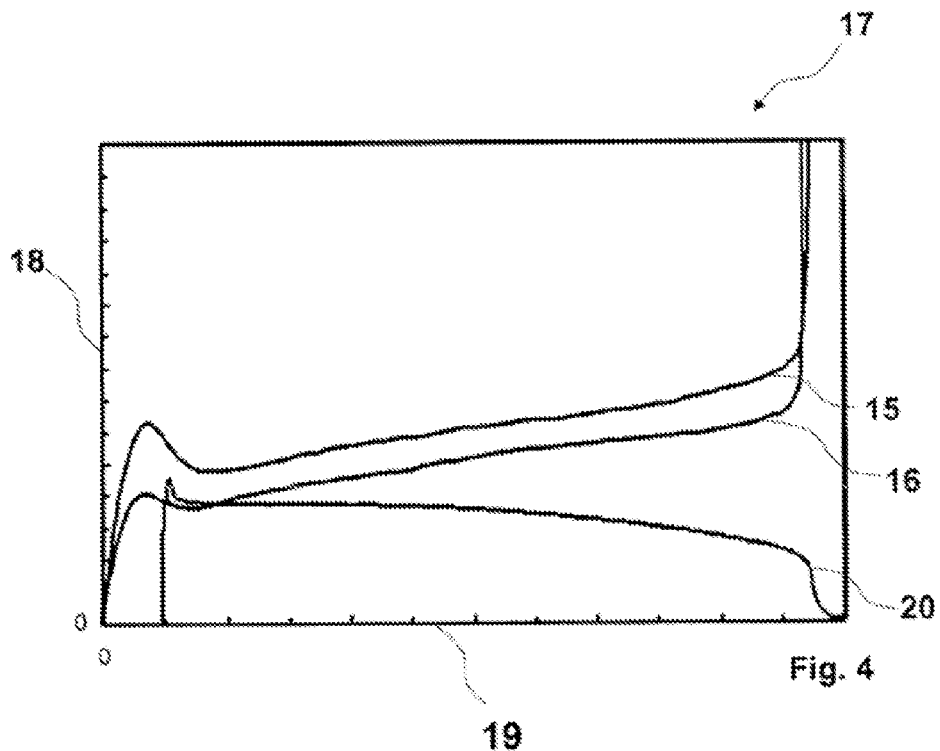

| DE | 28 07 485 | A1 |   | 8/1979 |
|---|---|---|---|---|
| DE | 39 40 313 | A1 |   | 6/1990 |
| DE | 44 20 758 | A1 |   | 12/1995 |
| DE | 101 25 111 | A1 |   | 12/2002 |
| DE | 102008021625 | A1 | * | 11/2008 |
| DE | 10 2009 012 216 | A1 |   | 9/2010 |
| DE | 10 2009 013 964 | A1 |   | 9/2010 |
| EP | 1701054 | A1 | * | 9/2006 |
| FR | 2 497 307 | A1 |   | 7/1982 |
| JP | 53-1436 | B1 |   | 1/1978 |
| JP | 6-101718 | A |   | 4/1994 |

OTHER PUBLICATIONS

German-language Written Opinion dated Mar. 14, 2012 (PCT/ISA/237) (five (5) pages).

German Search Report with English Translation dated Jan. 23, 2012 (ten (10) pages).

Japanese Notification of Reason for Refusal dated Jan. 6, 2015 with English-language translation (four (4) pages).

English-language translation of Chinese Office Action dated Feb. 15, 2015 (three (3) pages).

English translation of Chinese Office Action dated Jun. 25, 2015 (Four (4) pages).

* cited by examiner

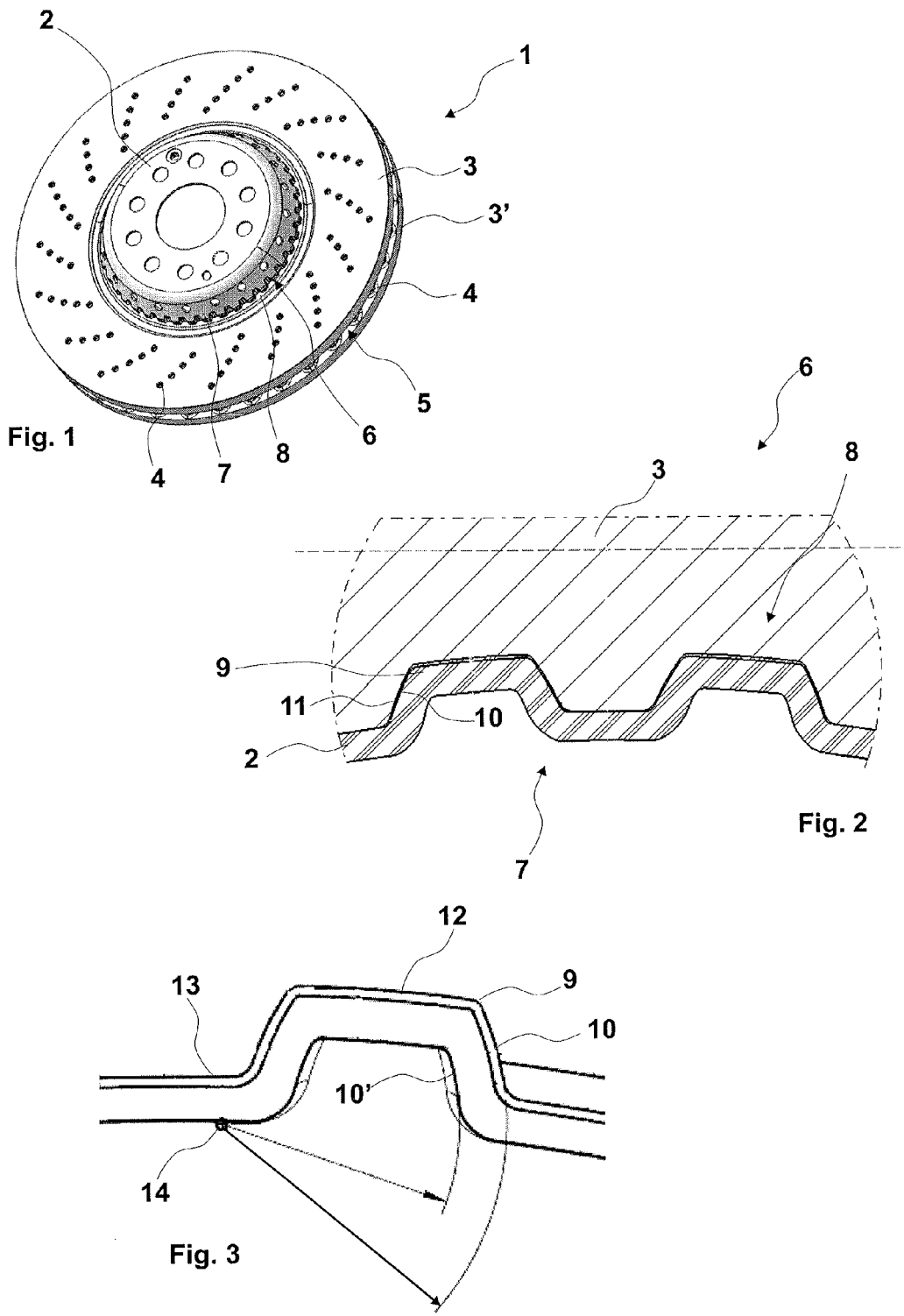

COMPOSITE BRAKE DISC

BACKGROUND AND SUMMARY OF THE INVENTION

Exemplary embodiments of the present invention relate to a composite brake disk for a motor vehicle, comprising a brake disk chamber and a brake ring.

In current one-piece cast brake discs both the brake ring and the brake disk chamber are manufactured from a cast material. A disadvantage of this one-piece type of construction is the high, unsprung weight. In order to reduce the weight, composite brake disks increasingly being used, which have a chamber made from an aluminium material and a cast iron brake ring. Although the weight of such a composite disk brake can be reduced by using this material pairing, the different thermal expansion coefficients of the materials of the brake disk chamber and of the brake ring leads to problems. Therefore, composite brake disks are also increasingly available on the market in which the brake disk chambers are fabricated from steel or another material containing iron. A steel sheet is typically used for this purpose, in order to reduce the weight of the brake disk.

German Patent Document DE 10 2009 012 216 A1 discloses such a composite brake disk with a break disk chamber constructed from steel sheet and a brake ring. The brake ring comprises two parts, namely two friction rings, which are separated from each other and connected to each other via studs. Thus, channels are formed between the two friction rings due to the separation between the two friction rings, through which the ambient air flows, and is thus able to convey heat away. One of the friction rings is equipped with an internal tooth profile, into which the tooth profile of the brake disc chamber is inserted. To provide axial security and mounting support, clips and support elements are formed on the brake disk chamber. By means of the clips and support elements a floating mounting of the friction ring on the brake disk chamber is achieved, so that a certain amount of play remains in the axial direction and also in the radial direction. Accordingly, the different amounts of thermal expansion of the friction ring and of the brake disk chamber can be adjusted.

Exemplary embodiments of the present invention are directed to an improved a composite brake disk, which is characterized by a simple, component-based positioning of the mating brake disk chamber and brake ring components.

In accordance with exemplary embodiments of the present invention, a brake disk chamber is equipped before the jointing process, at least at its open end, with a brake disk chamber tooth profile and to form at least one brake ring in such a way that it is equipped before the jointing process with an internal brake ring tooth face, whereby the brake disk chamber tooth faces of the brake disk chamber teeth, as well as the brake ring tooth faces of the brake ring tooth profile have different fits in the jointing area.

Preferably the brake disk chamber tooth profile has a brake disk chamber tooth face of circular arc form, whereas the brake ring tooth profile has tooth faces in the form of an involute.

If both tooth profiles are dimensioned oversize in respect of one another, the two components can be joined by means of the over-sizing, whereby a stressed condition exists between the individual joined components, which facilitates a fixing of the brake disk chamber and brake ring. Through such a development of the tooth faces of brake ring and brake disk chamber a simple, component-centered positioning of the joint component partners is obtained by means of the principle of tooth face centering, whereby the brake ring tooth faces and/or the brake disk chamber tooth faces can be subjected to elastic-plastic deformation during the jointing process. The named teething format should not be confused with a spline/involute spline, as described for example in DIN 5480, since on at least one tooth profile an elastic-plastic deformation occurs. Thus, the method involved here is principally a "face-centered" construction with the aim of achieving a defined state of stress, even under different torque loadings and different amounts of engagement ("bite") between brake disk chamber and brake ring.

In an advantageous further aspect of the present invention a gap is arranged between the tips of the teeth and the roots of the teeth of the tooth profile at all operating temperature ranges, so that the tips of the teeth and the roots of the teeth have no percentage contact area and thus the torque is principally transmitted via the faces of the teeth, whereby the basic character of a (tooth) face centering concept is provided.

Furthermore, the brake disk chamber in the unequipped state has a basically conical form, whereby the brake disc chamber has a gradually increasing reference teething diameter towards its open end. Thus, the increasing elasticity can be compensated and also in the axial direction a uniform percentage contact area can be obtained.

Furthermore, it is advantageous if the circular arc of the chamber-side tooth faces are laid out relative to the tooth face form in the brake ring such that an as wide as possible contact pattern is achieved via the tooth faces, so that the surface pressure is kept as low as possible and is distributed as evenly as possible. Here, the term contact pattern is refers to the contact zone of the tooth faces with each other in the assembled condition.

During the joining process at least the brake disk chamber experiences both elastic and elastic-plastic deformation in the region of the joint. Accordingly, a greater and more efficient utilization of material is achieved than in the case of a conventional elastic layout. It can be shown that the elastic-plastic deformation is due to the higher pressing-in forces on the initial joining in comparison with a repeated, second joining process.

Further important features and advantages of the invention result from the claims, the drawings, and the associated descriptions based on the figures.

It is clear, that the above named and the following features, yet to be explained, can be used not only in the respective given combination, but also in other combinations or in solitary use, outside the framework of the present invention.

BRIEF DESCRIPTION OF THE DRAWING FIGURES

Preferred example embodiments of the invention are represented in the drawings and are explained in greater detail in the following description, whereby the same reference symbols relate to the same or similar or functionally equivalent components.

Figure 5:
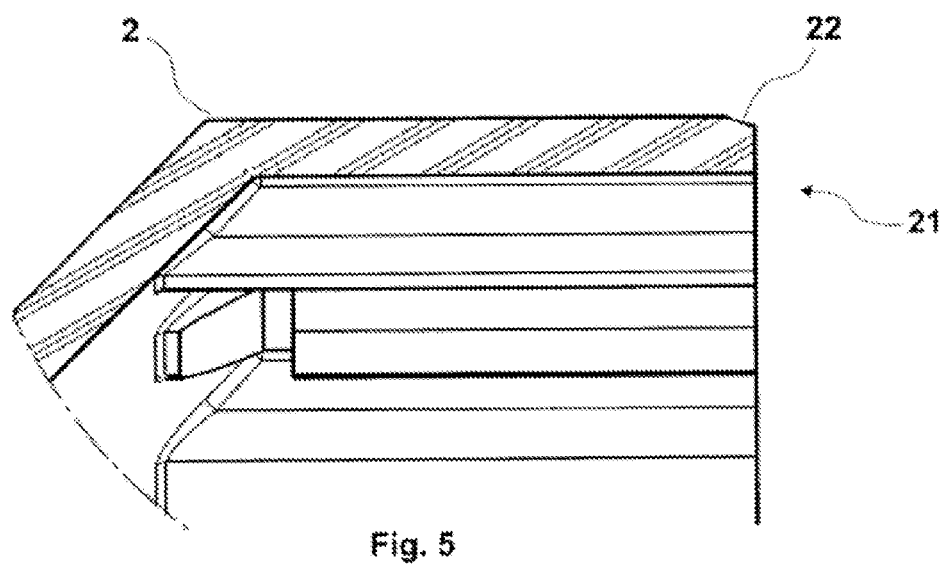

The following are represented schematically:

FIG. 1 A 2-part composite brake disk according to the invention with a brake disk chamber and two brake rings, FIG. 2 A joint area of the brake disk chamber and a brake ring, FIG. 3 A tooth of the brake disk chamber, FIG. 4 A press-in force pattern with initial and repeated joining, FIG. 5 An open end of the brake disk chamber with a surrounding chamfer.

DETAILED DESCRIPTIONS

FIG. 1 illustrates a composite brake disk 1, a brake disk chamber 2 and at least one brake ring 3, 3'. If two brake rings 3, 3' are provided, then the brake rings 3,3' can be connected to each other by means of a number of connecting studs 4 and spaced from each other by the same means, so that a number of channels 5 are formed between the brake rings 3,3', through which the surrounding air flows and is thus able to conduct away heat generated due to friction. In a joint area 6 the brake disk chamber 2 has an outward-pointing tooth profile 7, which is in working contact with an inside brake ring tooth profile 8 of the at least one brake ring 3, so that torque can be transmitted between the brake disk chamber 2 and the at least one brake ring 3.

FIG. 2 illustrates the joint area 6 in which the brake disc chamber 2 is connected with the at least one brake ring 3. It is apparent from this figure that the brake disk chamber 2 is formed with a thin wall, at least in the joint area 6, whereby, at least in the joint area 6, an initial wall thickness of the brake disk chamber 2 can have a value in the unobstructed condition before the joining process of between 1.5 mm and 5 mm. Preferably the initial wall thickness is 2.5 mm. Furthermore, the joint area 6 can have a joint length of 10 to 15 mm and is preferably 12.5 mm in length. A joint length of this order can also come into use with a joint diameter of 160 mm to 200 mm. Here, it is understood that the joint diameter is a reference diameter of the toothed assembly 7, 8. In such an embodiment with the joint lengths and joint diameters described above, the ratio of joint length to joint diameter is clearly greater than 1:10. This represents an extreme ratio for customary shaft-hub connections and can also come into use for other joint lengths and joint diameters.

Many brake disk chamber teeth 9 thereby engage in the brake ring tooth profile 8, whereby respectively an outside brake disk chamber tooth face 10 is supported on a brake ring tooth face 11, such that the torque is principally transmitted via the tooth faces 10, 11.

FIG. 3 shows a possible arrangement of the brake disk chamber tooth 9 with the outside circular brake disk chamber tooth face 10. Here both the outside brake disk chamber tooth face 10 and an inside brake disk chamber tooth face 10' have a circular form. A brake disk chamber tooth tip 12 is adjacent to a flattened brake disk chamber tooth root 13. A position in the area of the brake disk chamber tooth root 13, inside or outside, can be taken as a reference point 14, serving as the center of the circle for the respective circular form brake disk chamber tooth faces 10, 11.

It is apparent from the plot of FIG. 4 that the pressing-in force 15 of a first pressing of the brake disk chamber 2 with which at least one brake ring 3 requires a greater force, than a pressing-in force trend 16 of a second pressing of the brake disk chamber 2 with at least one brake ring 3. This is shown in a force-displacement diagram 17 in FIG. 4, with force represented on the ordinate 18 and displacement represented on the ordinate 19. Furthermore, a pressing-in force curve 20 on the pressing-out of the brake disk chamber 2 from the, at least one brake ring 3, between the first pressing and the second pressing is also represented in FIG. 4. In the force-displacement diagram 17 the pressing force curves 15, 16 of the first and second pressing of the brake disk chamber 2 with the, at least one brake ring 3, implies that at least one brake ring 3 is subjected to an elastic-plastic deformation in addition to an elastic deformation.

An open end 21 of the brake disk chamber 2 represented in FIG. 5 can have a chamfer 22, which is provided on the outside of the brake disc chamber 2. This chamfer 22 can be formed around the brake disk chamber tooth faces 10, the brake disk chamber tooth tips 12 and/or on the brake disk chamber tooth roots 13. By means of this chamfer 22 the brake disk chamber 2 can be more easily connected with and joined to the at least one brake ring 3.

The following advantages are obtained by means of the brake disk 1 according to the invention:
- A simple, component-centered positioning of the jointed components 2,3,
- A weight-reduction in comparison to one-piece cast brake disks,
- A particularly effective utilization of material due to the elastic-plastic deformation when joining the brake disk chamber 2 with the, at least one brake disk 3,3'.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A composite brake disk for a motor vehicle, comprising:
a brake disk chamber; and
at least one associated brake ring joined to the brake disk chamber by a joining process,
wherein, in a joint area, an inside brake ring tooth profile engages with a brake disk chamber tooth profile at an angle offset relative to a planar surface of the at least one associated brake ring,
wherein brake disk chamber tooth faces of the brake disk chamber-tooth profile and brake ring tooth faces of the inside brake ring tooth profile have different fits in the joint area,
wherein the brake disk chamber has a conical basic form before the joining process and a reference teething diameter, which increases towards an open end of the brake disk chamber, and
wherein the conical basic form of the brake disk chamber is modified by the joining process.

2. The composite brake disk according to claim 1, wherein the brake disk chamber tooth faces of the brake disk chamber tooth profile have a circular arc form, and brake ring tooth faces of the inside brake ring tooth profile have an involute form.

3. The composite brake disk according to claim 2, wherein the circular arc form of the brake disk chamber tooth faces are laid out relative to the involute form of the brake ring tooth faces in a contact pattern, the contact pattern being as wide as possible.

4. The composite brake disk according to claim 3, wherein the contact pattern allows surface pressure to be kept low and evenly distributed.

5. The composite brake disk according to claim 1, wherein the brake disk chamber tooth profile and the inside brake ring tooth profile have tooth tips and tooth roots, wherein a gap is arranged between the tooth tips and the tooth roots of the respective tooth profiles in all operating temperature ranges.

6. The composite brake disk according to claim 1, wherein the brake disk chamber tooth profile points outward at an angle offset relative to a planar surface of the brake disk chamber.

7. A method for forming a composite brake disk, the method comprising:

providing a brake disk chamber;
providing at least one brake ring; and
joining the brake disk chamber and the at least one brake ring by
engaging, in a joint area, an inside brake ring tooth profile with a brake disk chamber tooth profile at an angle offset relative to a planar surface of the at least one associated brake ring, wherein brake disk chamber tooth faces of the brake disk chamber-tooth profile and brake ring tooth faces of the inside brake ring tooth profile have different fits in the joint area, and
subjecting the inside brake ring tooth profile or the brake disk chamber-tooth profile to elastic-plastic deformation at least in an area of the respective tooth faces due to the joining process.

8. A method for forming a composite brake disk, the method comprising:
providing a brake disk chamber having a conical basic form and a reference teething diameter that increases towards an open end of the brake disk chamber;
providing at least one brake ring; and
joining the brake disk chamber and the at least one brake ring by engaging, in a joint area, an inside brake ring tooth profile with a brake disk chamber tooth profile at an angle offset relative to a planar surface of the at least one associated brake ring, wherein brake disk chamber tooth faces of the brake disk chamber-tooth profile and brake ring tooth faces of the inside brake ring tooth profile have different fits in the joint area, wherein the joining of the brake disk chamber and the at least one brake ring further comprises subjecting the inside brake ring tooth profile or the brake disk chamber-tooth profile to elastic-plastic deformation at least in an area of the respective tooth faces due to the joining process.

* * * * *